3,696,093
2,4-BENZODIAZEPINES
Herman Robert Rodriguez, New York, N.Y., and George de Stevens, Summit, N.J., assignors to Ciba-Geigy Corporation, Ardsley, N.Y.
No Drawing. Continuation-in-part of application Ser. No. 29,257, Apr. 16, 1970, which is a continuation-in-part of application Ser. No. 840,833, July 10, 1969, now abandoned, which is a continuation-in-part of application Ser. No. 694,421, Dec. 29, 1967, now abandoned, which in turn is a continuation-in-part of application Ser. No. 630,497, Apr. 13, 1967, now abandoned. This application Sept. 30, 1970, Ser. No. 77,004
Int. Cl. C07d 53/04, 57/00, 99/10
U.S. Cl. 260—239 BD        8 Claims

ABSTRACT OF THE DISCLOSURE 4,5-dihydro-1H-2,4-benzodiazepines, e.g. those of the formula

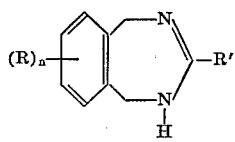

R=H, alkyl, free, etherified or esterified OH or SH, $CF_3$, $NO_2$ or amino; $n=1$ or 2
R'=H, OH, SH, amino or an aliphatic, araliphatic or aromatic radical
acyl derivatives, N-oxides, quaternaries or salts thereof, are antihypertensives and increase the contractile force of the heart.

CROSS-REFERENCE TO RELATED APPLICATIONS

This is a continuation-in-part of application Ser. No. 29,257, filed Apr. 16, 1970, which in turn is a continuation-in-part of application Ser. No. 840,833, filed July 10, 1969 (now abandoned), which in turn is a continuation-in-part of application Ser. No. 694,421, filed Dec. 29, 1967 (now abandoned), which in turn is a continuation-in-part of application Ser. No. 630,497, filed Apr. 13, 1967 (now abandoned).

SUMMARY OF THE INVENTION

The present invention concerns and has for its object the provision of new 4,5-dihydro-1H-2,4-benzodiazepines, more particularly of those corresponding to Formula I

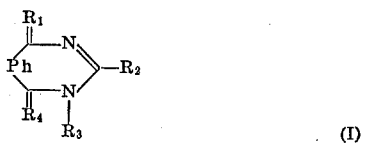

in which Ph is a 1,2-phenylene radical, each of $R_1$ and $R_4$ are two hydrogens or aliphatic radicals; or one-hydrogen atom together with an aliphatic, araliphatic or aromatic radical, $R_2$ is hydrogen hydroxy, mercapto, an amino group, an aliphatic, araliphatic or aromatic radical and $R_3$ is hydrogen, an aliphatic, araliphatic or aromatic radical or the acyl radical of a carboxylic acid, of N-oxides, quaternaries and salts thereof, as well as of corresponding pharmaceutical compositions and methods for the preparation and application of these products. Said products are useful cardiovascular agents, for example, in the treatment or management of the various forms of hypertension or of congestive heart failure.

DESCRIPTION OF THE PREFERRED EMBODIMENTS

The 1,2-phenylene radical Ph is unsubstituted or substituted by one or more than one, preferably one or two of the same or different substituents attached to any of the positions available for substitution. Such substituents are, for example, lower alkyl, such as methyl, ethyl, n- or i-propyl or -butyl, free, etherified or esterified hydroxy or mercapto, for example, lower alkoxy, alkylenedioxy or alkylmercapto, such as methoxy, ethoxy, n- or i-propoxy or -butoxy, methylenedioxy, 1,1- or 1,2-ethylenedioxy, methyl- or ethylmercapto, or halogeno, such as fluoro, chloro or bromo, trifluoromethyl, nitro or amino, such as di-lower alkylamino, e.g. dimethylamino or diethylamino. The term "lower," referred to above and hereinafter in connection with organic radicals or compounds respectively, defines such with up to 7, preferably up to 4, carbon atoms. Preferred radicals Ph are 1,2 - phenylene, (lower alkyl)$_n$ - 1,2 - phenylene, (lower alkoxy)$_n$ - 1,2 - phenylene, (lower alkylmercapto)$_n$ - 1,2 - phenylene, (halogeno)$_n$ - 1,2 - phenylene, (trifluoromethyl)$_n$ - 1,2 - phenylene, (nitro)$_n$-1,2-phenylene or (di-lower alkylamino)$_n$-1,2-phenylene, wherein $n$ is the integer 1 or 2.

An aliphatic hydrocarbon radical mentioned for $R_1$ to $R_4$ is, for example, lower alkyl, e.g. that mentioned above, but also straight or branched pentyl, hexyl or heptyl bound in any position, or lower alkenyl, e.g. allyl, methallyl or 3-butenyl. These radicals are preferably unsubstituted, but may be substituted, for example by free or esterified hydroxy groups, for example, halogen atoms, such as hydroxy- or halogeno-lower alkyl, e.g. chloromethyl, 2-hydroxy- or chloroethyl, or may be interrupted by heteroatoms, preferably by one oxygen, sulfur and/or nitrogen atom, such as lower alkoxy-lower alkyl, e.g. methoxymethyl, ethoxymethyl, n-propoxymethyl, 1-2- or 3-methoxy-, -ethoxy- or n-propoxy-propyl or 4-tert. butoxy-butyl, the corresponding lower alkylmercapto-lower alkyl groups, mono- or di-lower alkylamino-lower alkyl, lower alkyleneimino-lower alkyl, aza-, oxa- or thia-alkyleneimino-lower alkyl or N-lower alkyl- or phenyl-aza-alkyleneimino-lower alkyl groups with preferably 4 to 6 ring-carbon atoms and in which radicals heteroatoms are separated by at least two carbon atoms, such as dimethylaminomethyl, 2 - methylamino-, 2 - dimethylamino- or 2 - diethylamino-ethyl, 3 - dimethylamino- or 3 - diethylamino-propyl, 2 - pyrrolidino-ethyl, piperidinomethyl, 3 - piperidino-propyl, 2 - piperazinoethyl, 2 - (4 - methyl-piperazino)-ethyl, 3 - (4 - ethyl-piperazino)-propyl, 2 - (4 - phenyl-piperazino)-ethyl, 2-morpholino-ethyl or 3 - thiamorpholino-propyl.

An aromatic radical mentioned for $R_1$ to $R_4$ represents, for example, monocyclic iso- or heterocyclic aryl, such as phenyl, pyridyl, thienyl, furyl, pyrryl, pyrazolyl or imidazolyl. They are unsubstituted or substituted by one or more than one of the same or different substituents, e.g. those mentioned for Ph. Preferred aromatic radicals are phenyl, (lower alkyl)-phenyl, (lower alkoxy)-phenyl, (lower alkylmercapto)-phenyl, (halogeno)-phenyl, (trifluoromethyl)-phenyl, (nitro)-phenyl or (di-lower alkylamino)-phenyl.

An araliphatic radical mentioned for $R_1$ to $R_4$, is preferably monocyclic iso- or heterocyclic aryl-lower alkyl or -alkenyl, such as benzyl, 1- or 2-phenyl-ethyl, furfuryl, thenyl or cinnamyl, which may be substituted as shown above.

An amino group $R_2$ is unsubstituted or substituted, for example, by an aliphatic, cycloaliphatic, araliphatic or aromatic radical, e.g. those mentioned above. It preferably is a secondary or tertiary amino group, for example, mono- or di-lower alkylamino, lower alkenylamino, 3 to 6 ring-membered cycloalkylamino or cycloalkyl-lower alkylamino, lower alkyleneimino or monoaza-, oxa- or -thia-lower alkleneimino, such as mono- or dimethylamino, mono or diethylamino, mono- or di-n- or i-propylamino; allylamino, methallylamino; cyclopropylamino, cyclopentyl amino, or cyclohexylamino; cyclopropylmethylamino or 2-cyclopentylethylamino; pyrrolidino piperidino, 1,4-pentyleneimino, 2,5- or 1,6-hexyleneimino or 2,6-heptyleneimino; piperazino, N-lower alkyl-piperazino, morpholino or thiamorpholino.

The carboxylic acid acyl radical $R_3$ is, for example, lower alkanoyl, such as acetyl, propionyl, butyryl or pivalyl.

The quaternaries of the invention are particularly those containing additional lower alkyl or aralkyl groups, such as those mentioned above, quaternizing at least one tertiary nitrogen atom present.

The compounds of the invention exhibit valuable pharmacological properties. Apart from coccidiostatic and some central nervous system stimulating effects, they primarily exhibit antihypertensive effects and increase the contractile force of the heart and its coronary blood flow. This can be demonstrated in animal tests using, for example, mammals or birds, e.g. mice, dogs or chicken, as test objects. The coccidiostatic effect can be demonstrated by the survival of chicken infected with sporulated oocysts of Eimeria tenella, but fed with a feed containing about 0.01–0.1%, preferably about 0.05% of the compounds of the invention. The central nervous system stimulation can be observed, for example, in the jiggle cage test with mice at subcutaneous doses between about 5 and 100 mg./kg./day, preferably between about 10 and 50 mg./kg./day. The antihypertensive effects and the increase of the contractile force of the heart are observed, for example, in unanesthetized renal hypertensive dogs or anesthetized dogs carrying a cardiac strain gauge respectively, at doses between about 1 and 50 mg./kg./day, preferably between about 5 and 25 mg./kg./day, applied either orally within gelatin capsules or in the form of aqueous solutions or suspensions into the lumen of the small intestine respectively. Accordingly, the compounds of the invention are preferably useful cardiovascular agents, for example, in the treatment or management of primary or secondary hypertension, e.g. essential or renal hypertension, or of congestive heart failure. Furthermore, the compounds of the invention are valuable intermediates in the preparation of other useful products, particularly of pharmacologically active compounds.

Particularly useful are compounds of Formula I, in which Ph is 1,2-phenylene, (lower alkyl)$_n$-1,2-phenylene, (lower alkoxy)$_n$-1,2-phenylene, (lower alkylmercapto)$_n$-1,2-phenylene, (halogeno)$_n$ - 1,2 - phenylene, (trifluoromethyl)$_n$-1,2-phenylene, (nitro)$_n$-1,2-phenylene or (di-lower alkylamino)$_n$-1,2-phenylene, $n$ is the integer 1 or 2, each of $R_1$ and $R_4$ are two hydrogens or hydrogen and lower alkyl, $R_5$-lower alkyl or $R_5$, $R_2$ is hydrogen, hydroxy, mercapto amino, mono- or di-lower alkylamino, lower alkenylamino, 3 to 6 ring-membered cycloalkylamino or cycloalkyl-lower alkylamino, lower alkyleneimino, monoaza-, -oxa- or -thia-lower alkyleneimino, lower alkyl, lower alkoxy-lower alkyl, halogeno-lower alkyl, di-lower alkylamino-lower alkyl, lower alkyleneimino-lower alkyl, monoaza-, -oxa- or -thia-lower alkyleneimino-lower alkyl, in which heterocyclic radicals 2 heteroatoms are separated from each other by at least 2 carbon atoms, $R_5$-lower alkyl or $R_5$, $R_3$ is hydrogen, lower alkyl, $R_5$-lower alkyl or lower alkanoyl, $R_5$ is phenyl, (lower alkyl)-phenyl, (lower alkoxy)-phenyl, (lower alkylmercapto)-phenyl, (halogeno)-phenyl, (trifluoromethyl)-phenyl, (nitro)-phenyl or (di-lower alkylamino)-phenyl, the N-oxide, lower alkylquaternaries or therapeutically useful acid addition salts thereof.

Compounds that are especially valuable are those of the Formulae II and III

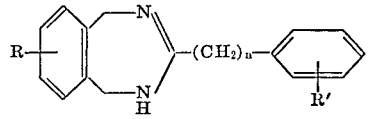

II

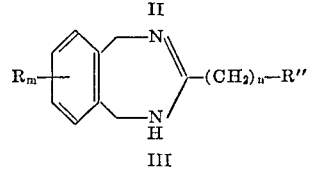

III in which $m$ is the integer 1 or 2, $n$ is the integer 0 to 1, each of R and R' is hydrogen, methyl, methoxy, chloro, trifluoromethyl or nitro and R'' is hydrogen, hydroxy, mercapto, methoxy, amino, mono- or dimethylamino, mono- or diethylamino, n- or i-propylamino, allylamino, cyclopropylamino or piperidino or therapeutically useful acid addition salts thereof which, when administered orally to unanesthetized renal hypertensive dogs or into a loop of the small intestine to anesthetized normotensive dogs at doses between about 5 and about 25 mg./kg./day, show an outstanding decrease of elevated blood pressure and an increase of the contractile force of the heart respectively (the latter is measured in ½ hour intervals with a cardiac strain gauge, sutured about 1 hour before drug application onto the left ventricle of the heart).

Of particular interest are compounds of Formula III, in which $m$ is the integer 1 or 2, $n$ is zero, R is hydrogen, methyl methoxy or chloro and R'' is amino, methylamino, dimethylamino, ethylamino, n- or i-propylamino, allylamino or cyclopropylamino, especially the 3-mono- or dimethylamino - 4,5 - dihydro-1H-2,4-benzodiazepine, the 7,8-dimethoxy derivative thereof or therapeutically useful acid addition salts of these compounds, which are highly active antihypertensive and positive inotropic agents.

The compounds of the invention are prepared according to methods in themselves known, for example, the corresponding process consists in (a) condensing a compound of the formula

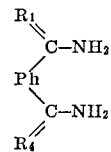

with a reactive functional derivative of a carboxylic acid or (b) ring-closing a compound of the formula

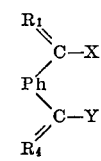

in which one of X and Y represents amino and the other a methylideneimino group and, if desired, converting a resulting compound into another compound of the invention.

A reactive functional derivative of a carboxylic acid is, for example, an ortho ester, imido ester, imido thioester, amidine or the nitrile of an aliphatic, araliphatic or aromatic carboxylic acid or a reactive carbonic acid derivative, such as O- or S-lower alkyl-isourea or isothiourea respectively, phosgene or diimidazolylcarbonyl.

The methylideneimino group present in the starting material mentioned under item (b) is, for example, that formed in the condensation of a compound having the formula

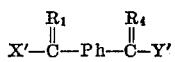

in which one of X' and Y' stands for amino and the other for potential amino, such as a nitro, azo or acylamino group, with the above-described reactive carboxylic acid derivatives. In the condensation product obtained, the potential amino group is then converted into amino, for example, by hydrogenation or hydrolysis, advantageously in an acidic medium. The following ring-closure is preferably carried out with the free bases or in the presence of a basic agent, advantageously under pyrolytic conditions.

The compounds of the invention so obtained may be converted into each other by known methods. Thus, for example, resulting compounds of Formula I in which $R_2$ is hydroxy or mercapto, may be etherified or esterified, for example with the use of reactive esters or alcohols, e.g. lower alkyl halides, or reactive functional acid derivatives, e.g. thionyl halides or phosphorus oxyhalides. Resulting 3-esters, -ethers or -haloalkyl compounds may be reacted with ammonia or amines in order to obtain the 3-amino or -aminoalkyl compounds. Resulting carbonyl compounds or halophenyl compounds may be hydrogenated with catalytically activated or nascent hydrogen, or with the use of complex light metal hydrides, such as lithium aluminum hydride or sodium borohydride in order to obtain the corresponding methylene or unsubstituted phenyl compounds. Primary, secondary or tertiary amines may be converted into tertiary amines or quaternaries respectively, for example, with the use of reactive esters of corresponding lower alkanols, derived, for example, from hydrohalic or sulfonic acids, e.g. hydrochloric, hydrobromic, methane-, ethane- or p-toluenesulfonic acid. The N-oxides of the invention are obtained, for example, by reacting the free bases with hydrogen peroxide or a peracid, e.g. peracetic, perbenzoic or monoperphthalic acid.

The above-mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The compounds of the invention are obtained in the free form or in the form of their salts depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araliphatic, aromatic or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic, aminobenzoic, anthranilic, hydroxybenzoic, salicyclic, aminosalicyclic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophan, lysine and arginine.

These or other salts, for example, the picrates, can also be used for the purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. Mainly, those starting materials should be used in the above reactions that lead to the formation of those compounds indicated as being specially valuable.

The starting material used is known or, if new, may be prepared according to the methods illustrated in the examples. Thus, for example, that mentioned under item (a) may be prepared either by reduction of corresponding amides, nitriles or anhydrides and/or amination of the corresponding alcohol derivatives, e.g. the hydrohalic or sulfonic acid esters. The preparation of the compounds shown under item (b) has been mentioned above.

Starting material or final products that are mixtures of isomers may be separated into single isomers by methods in themselves known. For example, compounds that contain one or more asymmetrical carbon atoms may be in the form of racemate mixtures, pure racemates or optical antipodes. Mixtures of racemates, by virtue of the physicochemical differences between the components, can be resolved into pure racemates, for example, by chromatography and/or fractional crystallization. Racemic products can likewise be resolved into the optical antipodes, for example, by reaction with optically active acids, separation of the diastereomeric salts and liberation of the bases from the salts.

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and /or (e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. They may also contain other therapeutically valuable substances. Said pharmaceutical compositions are prepared according to conventional mixing, granulating or coating methods respectively and contain about 0.1 to 75%, preferably about 1 to 50% of the active ingredient.

The following examples illustrate the invention and are not to be construed as being limitations thereon. Temperatures are given in centigrade and all parts given are parts by weight.

EXAMPLE 1

To the solution of 2.0 g. of 1,2-bis-aminomethyl-benzene in 40 ml. ethanol, 1.78 g. acetimidic acid ethyl ester hydrochloride are added and the mixture is refluxed for 16 hours. Hereupon it is evaporated to about ⅔ of the original volume and allowed to stand at room temperature for 2 hours. The precipitate is filtered off, washed with diethyl ether and dried to yield the 3-methyl-4,5- dihydro-1H-2,4-benzodiazpine hydrochloride of the formula

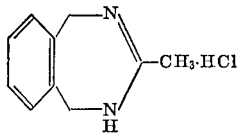

melting at 283° with decomposition.

The starting material is prepared as follows: 4.0 g. 1,2-bis-aminomethyl-benzene dihydrochloride are dissolved in 10 ml. water and the solution is made basic with aqueous sodium hydroxide to a pH of about 12. The mixture is extracted twice with 75 ml. chloroform each, the combined extract washed with 10 ml. water, dried and evaporated to yield the corresponding free amine.

EXAMPLE 2

To the solution of 4.0 g. 1,2-bis-aminomethyl-benzene in 100 ml. ethanol, 5.6 g. phenyl-acetimidic acid ethyl ester hydrochloride are added and the mixture is refluxed for 16 hours. Hereupon it is concentrated to about 25 ml. and allowed to stand at room temperature for two hours. It is filtered, the residue washed with diethyl ether and dried to yield the 3-benzyl-4,5-dihydro-1H-2,4-benzodiazpine hydrochloride of the formula

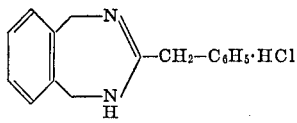

melting at 256–259° with decomposition.

EXAMPLE 3

To the solution of 5.0 g. 1,2-bis-aminomethyl-benzene in 125 ml. ethanol, 8.1 g. 4-chloro-benzimidic acid ethyl ester hydrochloride are added and the mixture is refluxed for 16 hours. It is allowed to cool and the precipitate formed filtered off, washed with diethyl ether and recrystallized from ethanol to yield the 3-(4-chloro-phenyl)-4,5-dihydro-1H-2,4-benzodiazepine hydrochloride of the formula

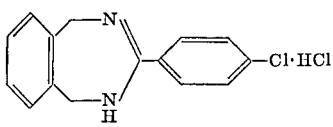

melting at 266–267°.

EXAMPLE 4

The mixture of 2.0 g. 1,2-bis-aminomethyl-benzene, 5.6 g. methoxyacetimidic acid ethyl ester hydrochloride and 125 ml. ethanol is refluxed for 16 hours. After cooling 1 liter diethyl ether are added while stirring. The precipitate formed is filtered off and recrystallized from n-butanol to yield the 3-methoxymethyl-4,5-dihydro-1H-2,4-benzodiazepine hydrochloride of the formula

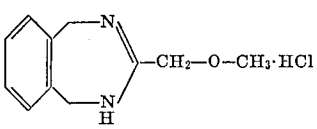

melting at 175–178°.

EXAMPLE 5

To the solution of 6.0 g. 1,2-bis-aminomethyl-benzene in 150 ml. tetrahydrofuran, that of 7.5 g. N,N'-diimidazolyl-carbonyl in 100 ml. tetrahydrofuran is slowly added while stirring and ice-cooling. The mixture is allowed to stand at room temperature overnight, the precipitate formed is filtered off and washed with tetrahydrofuran, to yield the 3-hydroxy-4,5-dihydro-1H-2,4-benzodiazepine of the formula

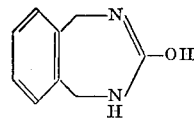

melting above 300°; in the I.R. spectrum it shows bands inter alia at 3115, 1595, 1485, 1390, 1340, 1265 and 1195 cm.$^{-1}$.

EXAMPLE 6

To the solution of 2.0 g. 1,2-bis-aminomethyl-benzene in 25 ml. methanol, 2.3 g. chloracetimidic acid ethyl ester hydrochloride are added and the mixture allowed to stand overnight. It is then added dropwise to a large volume of diethyl ether while stirring and the precipitate formed is filtered off to yield the 3-chloromethyl-4,5-dihydro-1H-2,4-benzodiazepine hydrochloride of the formula

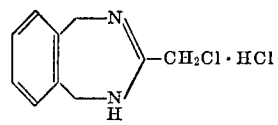

melting at 263–264°.

The solution of 10 g. thereof in the minimum amount of water is made basic with sodium hydroxide to a pH of about 9. The precipitate formed is filtered off, washed with water, dried and recrystallized from ethyl acetate to yield the corresponding base melting at 235–240°.

The starting material is prepared as follows: The mixture of 500 g. 1,2-bis-bromomethyl-benzene, 1 kg. potassium phthalimide and 3.78 lt. dimethylformamide is refluxed for 16 hours while stirring. It is cooled to about 100°, diluted with an equal volume of water, the precipitate formed filtered off, washed with water, ethanol and diethyl ether to yield the 1,2-bis-phthalimidomethyl-benzene melting at 275°.

To the mixture of 200 g. thereof and 7 lt. n-butanol, 48.5 ml. hydrazine hydrate are added and the mixture is refluxed for 16 hours while stirring. Hereupon 100 ml. concentrated hydrochloric acid are added and refluxing is continued for 24 hours. The mixture is concentrated to about ½ of its volume in vacuo, the precipitate formed filtered off and triturated with 500 ml. water. The aqueous solution is evaporated in vacuo and the residue triturated with methanol to yield the 1,2-bis-aminomethyl-benzene dihydrochloride melting above 300° after recrystallization from aqueous ethanol.

EXAMPLE 7

To 50 ml. of a saturated solution of dimethylamine in methanol, 4.5 g. 3-chloromethyl-4,5-dihydro-1H-2,4-benzodiazepine are added and the mixture refluxed for ½ an hour. It is cooled, acidified with ethanolic hydrochloric acid and the precipitate formed filtered off to yield the 3-dimethylaminomethyl-4,5-dihydro-1H-2,4-benzodiazepine dihydrochloride of the formula

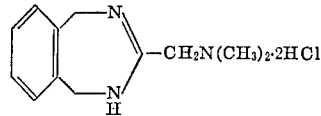

melting at 239–241°.

EXAMPLE 8

The mixture of 7.5 g. 3-hydroxy-4,5-dihydro-1H-2,4-benzodiazepine and 30 ml. phosphorus oxychloride is heated at the steam bath for 3 hours while stirring. It is evaporated in vacuo, the residue triturated with ethyl acetate, the solid filtered off and added portionwise to 200 ml. liquid ammonia. The mixture is stirred and allowed to evaporate at room temperature during about 3 hours. The residue is taken up in water, the solution made strongly basic with saturated aqueous potassium hydroxide and extracted with chloroform. The extract is dried, filtered and evaporated. The residue is taken up in ethanol, the solution acidified with ethanolic hydrochloric acid, the precipitate formed filtered off and recrystallized from ethanol-methanol to yield the 3-amino-4,5-dihydro-1H-2,4-benzodiazepine hydrochloride of the formula

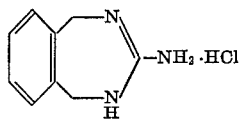

melting at 279–281°.

EXAMPLE 9

To the filtrate obtained from the mixture of 20 g. imidazole, 350 ml. tetrahydrofuran and the solution of 8.6 g. thiophosgene in 50 ml. tetrahydrofuran, the solution of 10 g. 1,2-bis-aminomethyl-benzene in 50 ml. tetrahydrofuran is added dropwise while stirring. The mixture is refluxed overnight, cooled, filtered and the residue washed with tetrahydrofuran to yield the 3-mercapto-4,5-dihydro-1H-2,4-benzodiazepine of the formula

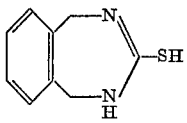

melting at 283–284°.

EXAMPLE 10

To the solution of 25 ml. piperidine in 20 ml. methanol, 10 g. 3-chloromethyl-4,5-dihydro-1H-2,4-benzodiazepine are added and the mixture is stirred overnight. It is diluted with toluene and evaporated in vacuo. The residue is dissolved in aqueous ethanol, the solution made basic with aqueous sodium hydroxide, extracted with chloroform and the extract dried, filtered and evaporated. The residue is dissolved in ethanol, the solution acidified with ethanolic hydrochloric acid, the precipitate formed filtered off and washed with diethyl ether to yield the 3-piperidinomethyl-4,5-dihydro-1H-2,4-benzodiazepine dihydrochloride of the formula

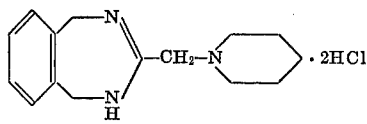

melting at 288–289°.

EXAMPLE 11

The mixture of 1.0 g. 3-(4-chloro-phenyl)-4,5-dihydro-1H-2,4-benzodiazepine hydrochloride, 100 ml. anhydrous ethanol and 0.2 g. 5% palladium on charcoal is hydrogenated at 25 p.s.i. for 3 hours at room temperature. It is filtered, the filtrate diluted with diethyl ether and the precipitate formed filtered off to yield the 3-phenyl-4,5-dihydro-1H-2,4-benzodiazepine hydrochloride of the formula

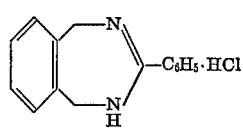

melting at 232–234°.

EXAMPLE 12

In the manner described in the previous examples the following compounds of Formula II are prepared from equivalent amounts of the corresponding starting material; they are monohydrochlorides and were recrystallized from ethanol:

| $R_6$: | M.P. |
|---|---|
| 4-NO$_2$—C$_6$H$_4$ | 278–280° |
| 3-NO$_2$—C$_6$H$_4$ | 260° |
| 4-CF$_3$—C$_6$H$_4$ | Above 300° |

EXAMPLE 13

Preparation of 10,000 tablets each containing 100 mg. of the active ingredient.

| Material: | G. |
|---|---|
| 3-amino-4,5-dihydro-1H-2,4-benzodiazepine hydrochloride | 1,000.0 |
| Lactose | 2,535.0 |
| Talcum powder | 150.0 |
| Magnesium stearate | 40.0 |
| Corn starch | 125.0 |
| Polyethylene glycol 6,000 | 150.0 |
| Purified water, q.s. | |

Procedure

All the powders are passed through a screen with an opening of 0.6 mm. Then the drug substance, lactose, talcum, magnesium stearate and ½ of the starch are mixed in a suitable mixer. The other ½ of the starch is suspended in 50 ml. water and the suspension added to the hot solution of the polyethylene glycol in 180 ml. water. The paste formed is added to the powders, which are granulated, if necessary, with an additional amount of water. The granulate is dried overnight at 35°, broken on a screen with 1.2 mm. opening and compressed into tablets using concave punches with 10.3 mm. diameter, uppers bisected.

In the analogous manner, tablets are prepared using 50–150 mg. of the compounds described in Examples 1–6.

EXAMPLE 14

To the solution of 5.0 g. 1,2-bis-aminomethyl-benzene in 125 ml. ethanol, 7.9 g. 4-methoxy-benzimidic acid ethyl ester hydrochloride are added and the mixture refluxed overnight and then kept in the refrigerator for 6 hours. The precipitate formed is filtered off, washed with diethyl ether and recrystallized from ethanol to yield the 3-(4-methoxy-phenyl)-4,5-dihydro-1H-2,4-benzodiazepine hydrochloride of the formula

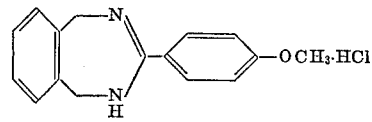

melting at 262–263°.

EXAMPLE 15

The solution of 2.0 g. 3-phenyl-4,5-dihydro-1H-2,4-benzodiazepine hydrochloride (Example 11) in the minimum amount of water is made basic with aqueous potassium hydroxide and extracted with chloroform. The extract is dried, filtered and evaporated. The residue is taken up in ethanol, the solution slightly acidified with ethanolic maleic acid, the precipitate formed filtered off and recrystallized from ethanol, to yield the 3-phenyl-4,5-dihydro-1H-2,4-benzodiazepine maleate of the formula

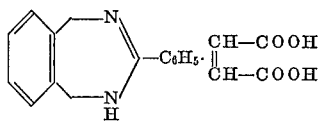

melting at 191–193°.

EXAMPLE 16

The mixture of 7.5 g. 3-hydroxy-4,5-dihydro-1H-2,4-benzodiazepine and 30 ml. phosphorus oxychloride is heated at the steam bath for about 3 hours while stirring and then evaporated in vacuo. To the residue the solution of 10 ml. methylamine in 100 ml. tetrahydrofurane is added and the mixture stirred at room temperature overnight. It is evaporated in vacuo, the residue taken up in water, the mixture made alkaline with aqueous potassium hydroxide and extracted with chloroform. The extract is dried, filtered, and evaporated. The residue is taken up in ethanol, the solution acidified with ethanolic hydrochloric acid, the precipitate formed filtered off and recrystallized from ethanol, to yield the 3-methylamino-4,5-dihydro-1H-2,4-benzodiazepine hydrochloride of the formula

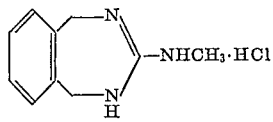

melting at 210–211°.

In the analogous manner the 3-dimethylamino-4,5-dihydro-1H-2,4-benzodiazepine hydrochloride is prepared from the same amounts of the corresponding starting material; it melts at 252–256°.

EXAMPLE 17

Preparation of 10,000 tablets each containing 50.0 mg. of the active ingredient:

| Formula: | G. |
|---|---|
| 3-methylamino - 4,5-dihydro - 1H-2,4-benzodiazepine hydrochloride | 500.00 |
| Lactose | 1,706.00 |
| Corn starch | 90.00 |
| Polyethylene glycol 6,000 | 90.00 |
| Talcum powder | 90.00 |
| Magnesium stearate | 24.00 |
| Purified water, q.s. | |

Procedure

All the powders are passed through a screen with an opening of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

Analogous tablets can be prepared using the 3-methyl-, 3-piperidinomethyl- or 3-dimethylamino-4,5-dihydro-1H-2,4-benzodiazepine hydrochlorides of Examples 1, 10 and 16 as drug substances.

EXAMPLE 18

The solution of 9.0 g. N-(2-aminomethyl-benzyl)-acetamidine in 100 ml. ethanol is refluxed for 24 hours. It is cooled, acidified with ethanolic hydrochloric acid and evaporated in vacuo. The residue is triturated with diethyl ether and recrystallized from ethanol, to yield the 3-methyl-4,5-dihydro-1H-2,4-benzodiazepine hydrochloride melting at 283° with decomposition; it is identical with the compound obtained according to Example 1.

The starting material is prepared as follows: The mixture of 500 g. 1,2-bis-bromomethyl-benzene, 500 g. potassium phthalimide and 3.78 liters dimethylformamide is refluxed for 10 hours while stirring and concentrated in vacuo. The precipitate formed after cooling is filtered off and recrystallized from aqueous ethanol, to yield the 2-phthalimidomethyl-benzyl bromide.

To the solution of 100 g. thereof in 1 liter dimethylsulfoxide, 57 g. sodium nitrite are added portionwise and the mixture is stirred for 10 hours at 50°. It is diluted with water, the precipitate formed filtered off, washed with water, ethanol and diethyl ether and recrystallized from ethanol - dimethylformamide, to yield the 1-nitromethyl-2-phthalimidomethyl-benzene.

The mixture of 20 g. thereof and 100 ml. concentrated hydrochloric acid is heated in a sealed tube for 3 hours to 175°. It is cooled, filtered, the residue washed with water and the filtrate made basic with aqueous sodium hydroxide. It is dried, extracted with chloroform, the extract filtered, evaporated in vacuo, and the residue recrystallized from aqueous ethanol to yield the 2-nitromethyl-benzylamine.

To the solution of 10 g. thereof in 50 ml. ethanol, 7.5 g. acetimidic acid ethyl ester hydrochloride are added and the mixture is refluxed for 3 hours. It is concentrated in vacuo, the precipitate formed filtered off, dissolved in the minimum amount of water and the solution made basic with aqueous potassium hydroxide. It is extracted with chloroform, the extract dried, filtered and evaporated in vacuo, to yield the N-(2-nitromethylbenzyl)-acetamidine.

12 g. thereof are hydrogenated in 100 ml. ethanol over 1 g. platinum oxide at an initial pressure of 45 p.s.i. at room temperature. After the uptake of the theoretical amount of hydrogen, the mixture is filtered, and evaporated in vacuo, to yield the N-(2-aminomethyl-benzyl)-acetamidine, which is used as such without further purification.

EXAMPLE 19

To 75 ml. liquid ethylamine, 15 g. 3-chloro-4,5-dihydro-1H-2,4-benzodiazepine (prepared according to Example 8) are added portionwise while stirring and cooling with a Dry Ice-acetone bath. After stirring overnight and allowing the temperature to rise to room temperature, the concentrate is diluted with 100 ml. methanol and added to the solution prepared from 3.1 g. sodium and 100 ml. methanol while stirring. After ½ hour, the mixture is filtered, the filtrate evaporated in vacuo below 40° and the residue taken up in diethyl ether. The solution is filtered, the filtrate evaporated, the residue taken up in the minimum amount of warm isopropanol, the solution neutralized with hydrogen chloride in ethyl acetate, the precipitate formed filtered off and recrystallized from isopropanol, to yield the 3-ethylamino-4,5-dihydro-1H-2,4-benzodiazepine hydrochloride of the formula

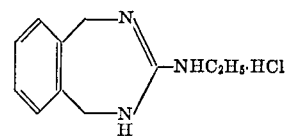

melting at 209–212°.

EXAMPLE 20

To 100 ml. n-propylamine, 15 g. 3-chloro-4,5-dihydro-1H-2,4-benzodiazepine are added portionwise while stirring and cooling with Dry Ice-acetone. Hereupon, the cooling is discontinued and the mixture stirred overnight at room temperature. It is evaporated in vacuo, the residue taken up in 100 ml. methanol, the mixture combined with the solution prepared from 3.1 g. sodium and 100 ml. methanol and the whole stirring for ½ hour at room temperature. After evaporation in vacuo, the residue is triturated with acetonitrile, filtered and the filtrate evaporated in vacuo. The residue is taken up in isopropanol, the solution neutralized with hydrogen chloride in ethyl acetate, the precipitate formed filtered off and recrystallized from water, to yield the 3-n-propylamino-4,5-dihydro-1H-2,4-benzodiazepine hydrochloride monohydrate of the formula

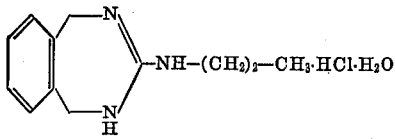

melting at 78–80°.

EXAMPLE 21

To the solution of 2.4 g. sodium methoxide in 100 ml. methanol, 4.8 g. 1,2-bis-aminomethyl-3-methyl-benzene dihydrochloride are added portionwise while stirring. After stirring for 1 hour at room temperature, the mixture is filtered, the filtrate evaporated in vacuo, the residue triturated with acetonitrile, the mixture filtered and the filtrate evaporated in vacuo. The residue is taken up in 50 ml. tetrahydrofuran and 4.0 g. N,N'-diimidazolylcarbonyl are added dropwise while stirring, and stirring is continued for 24 hours at room temperature. The precipitate formed is filtered off and washed with cold tetrahydrofuran, to yield the 3-hydroxy-6-methyl-4,5-dihydro-1H-2,4-benzodiazepine of the formula

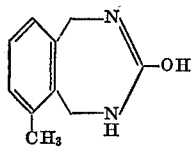

showing in the I.R. spectrum bands at 3440, 1640 and 750 cm.$^{-1}$.

The starting material is prepared by bromination of hemimellitene, separation of the 1,2-bis-bromomethyl-3-methylbenzene from the reaction mixture by fractional distillation under reduced pressure, and its amination according to Example 6.

EXAMPLE 22

The hot solution of 7.8 g. sodium methoxide in 1 liter methanol is slowly added to 16 g. 1,2-bis-aminomethylbenzene dihydrochloride hemihydrate while stirring, and stirring is continued for ½ hour. The mixture is filtered through a fritted glass funnel and the filtrate evaporated in vacuo. The resulting semi-solid free base is triturated with diethyl ether, filtered again, and the filtrate evaporated. The residue is taken up in 200 ml. n-butanol, 18 g. 1,2,3 - trimethyl - 2 - thiopseudourea hydroiodide are added (the mixture refluxed for 24 hours and evaporated in vacuo, to yield the 3-methylamino-4,5-dihydro-1H-2,4-benzodiazepine hydroiodide of the formula

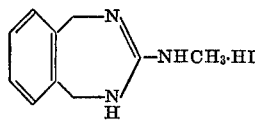

melting at 175°. It is taken up in 500 ml. methanol, 7.2 g. freshly prepared silver chloride are added and the suspension is stirred for ½ hour at room temperature. It is filtered, the filtrate evaporated in vacuo and the residue recrystallized from isopropanol, to yield the corresponding hydrochloride melting at 214–216°; it is identical, but somewhat purer, than that obtained according to Example 16.

EXAMPLE 23

To the mixture of 31.2 g. sodium methoxide and 400 ml. methanol, 64 g. 1,2-bis-aminomethyl-benzene dihydrochloride are added portionwise while stirring. After ½ hour, the mixture is filtered, the residue washed with methanol and the filtrate evaporated. The residue is taken up in 800 ml. n-butanol, 87.5 g. 1,3-dicyclopropyl-2-methyl-2-thiopseudourea hydroiodide are added and the mixture refluxed for 4 days. It is evaporated in vacuo, the residue taken up in 1 liter methanol, 29 g. freshly prepared silver chloride are added and the suspension stirred for 1 hour at room temperature. It is filtered, the filtrate evaporated in vacuo and the residue recrystallized from ethanol-acetonitrile, to yield the 3-cyclopropyl-amino - 4,5 - dihydro - 1H - 2,4 - benzodiazepine hydrochloride of the formula

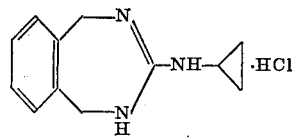

melting at 195–198°.

The starting material is prepared as follows: To the solution of 65 g. cyclopropylamine in 500 ml. tetrahydrofuran, the mixture of 35 g. thiophosgene and 100 ml. tetrahydrofuran is added dropwise while stirring and stirring is continued for 2 hours at room temperature. The mixture is filtered, the filtrate evaporated in vacuo and the residue triturated with ethyl acetate, to yield the 1,3-dicyclopropyl-thiourea.

The mixture of 27 g. thereof, 40 g. methyliodide and 200 ml. methanol is allowed to stand at room temperature for 1 hour and at the steam bath for 1 hour. It is evaporated in vacuo and the residue recrystallized from ethyl acetate-acetonitrile, to yield the 1,3-dicyclopropyl-2-methyl-2-thiopseudourea hydroiodide melting at 146–149°.

In the analogous manner, the 3-isopropylamino-4,5-dihydro-1H-2,4-benzodiazepine hydrochloride is prepared, M.P. 196–198°; its hydroiodide melts at 251–254°.

EXAMPLE 24

The mixture of 12 g. 1,3-diallyl-thiourea, 15 g. methyliodide and 100 ml. methanol is heated at the steam bath for 2 hours. It is evaporated in vacuo, the residue taken up in 100 ml. n-butanol, 10 g. 1,2 - bis - aminomethyl-benzene are added and the whole refluxed for 1 day. The mixture is evaporated in vacuo, the residue taken up in 100 ml. methanol, 15 g. freshly prepared silver chloride are added and the suspension stirred for 1 hour at room temperature. It is filtered, the filtrate evaporated in vacuo and the residue recrystallized from ethanol-acetonitrile, to yield the 3 - allylamino - 4,5 - dihydro - 1H - 2,4-benzodiazepine hydrochloride of the formula

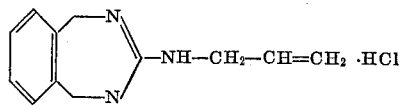

melting at 170–171°.

EXAMPLE 25

The mixture of 18.7 g. 1,2 - bis - aminomethyl - 4,5-dimethoxybenzene, 26 g. 1,2,3 - trimethyl - 2 - thiopseudourea hydroiodide and 360 ml. n-butanol is refluxed for 48 hours. It is evaporated in vacuo, the residue taken up in the minimum amount of methanol, 15 g. freshly prepared silver chloride are added and the suspension stirred for 1 hour at room temperature. It is filtered, the filtrate evaporated in vacuo, the residue recrystallized from isopropanol and dissolved in the minimum amount of water. The solution is made basic with 2 N aqueous sodium hydroxide, extracted with diethyl ether, the extract dried, filtered and evaporated. The residue is taken up in ethanol, the solution acidified with ethanolic hydrogen chloride, diluted with isopropanol and the precipitate formed filtered off, to yield the 3 - methylamino- 7,8 - dimethoxy - 4,5 - dihydro - 1H - 2,4 - benzodiazepine hydrochloride of the formula

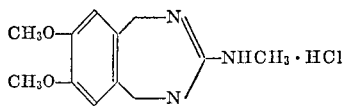

melting at 257–260°.

The starting material is prepared as follows: Through 320 ml. 37.5% aqueous formaldehyde, hydrogen chloride is bubbled for 45 minutes at 15–20°, whereupon 32 g. veratric acid are added and the mixture stirred for 7 hours at about 65°. It is allowed to stand overnight at room temperature, evaporated in vacuo and the residue taken up in 250 ml. water. The solution is neutralized with aqueous ammonia, filtered and the residue washed with water, to yield the 4,5-dimethoxy-phthalide, melting at 154–156°.

The solution of 19.4 g. thereof in 400 ml. tetrahydrofuran is added dropwise to the suspension of 3.8 g. lithium aluminum hydride and 100 ml. tetrahydrofuran while while stirring at 0–5° under nitrogen. After stirring for 3½ hours at room temperature, the mixture is refluxed for 5 hours and stirred overnight at room temperature. It is cooled in an ice bath, 10 ml. water are added dropwise while stirring, the mixture filtered and the filtrate evaporated in vacuo. The residue is recrystallized from ethyl acetate, to yield the 1,2 - bis - hydroxymethyl - 4,5-dimethoxybenzene melting at 108–111°.

The mixture of 9.9 g. thereof and 25 ml. thionylchloride is stirred at room temperature overnight and evaporated, to yield the 1,2 - bis - chloromethyl - 4,5 - dimethoxybenzene melting at 85–90°.

10 g. thereof are added to the mixture prepared from 6 g. 57% sodium hydride in mineral oil, 17.7 g. phthalimide and 120 ml. dimethoxyformamide while cooling and stirring under nitrogen. The mixture is refluxed for 1½ hours, cooled and 130 ml. water are added. The precipitate formed is filtered off, washed with water, acetone and diethyl ether, to yield the 1,2-bis-phthaliminomethyl-4,5-dimethoxy-benzene melting at 257–260°.

To the mixture of 22.7 g. thereof and 500 ml. n-butanol, 4.7 ml. 99% hydrazine hydrate are added dropwise while stirring and the mixture refluxed for 16 hours. Hereupon 10 ml. concentrated hydrochloric acid are added and refluxing is continued for 24 hours. The mixture is evaporated in vacuo, the residue taken up in 150 ml. water, the solution filtered, the filtrate evaporated in vacuo and the residue recrystallized from aqueous isopropanol, to yield the 1,2-bis-aminomethyl-4,5-dimethoxy-benzene dihydrochloride, melting at 299°. It is converted into the free base as described in Example 22.

EXAMPLE 26

To the solution of 10.8 g. sodium methoxide in 200 ml. methanol, 22.3 g. 1-aminomethyl-2-methylaminomethyl-benzene dihydrochloride are added while stirring. After 4 hours the mixture is filtered, the filtrate concentrated in vacuo and the concentrate triturated with diethyl ether. The additional solid formed is discarded, and the filtrate evaporated in vacuo, to yield a strongly basic oil. It is dissolved in 500 ml. n-butanol, 12.0 g. acetimidic acid ethyl ester are added and the solution is refluxed for 24 hours. After cooling overnight it is filtered and the residue recrystallized from isopropanol to yield the 3,4-dimethyl-4,5-dihydro-1H-2,4-benzodiazepine hydrochloride of the formula

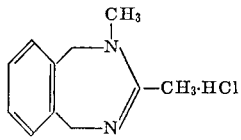

showing I.R.-bands at 3134, 3120 and 1665 cm.$^{-1}$.

The starting material is prepared in the following manner: Through the solution of 57.0 g. 2-phthalimidomethyl-benzyl bromide (Example 18) in 200 ml. dimethylformamide, methylamine gas is bubbled while cooling, to maintain room temperature. After saturation is complete, the solution is allowed to remain at room temperature overnight. It is evaporated in vacuo, the residue suspended in 200 ml. concentrated hydrochloric acid and the suspension refluxed overnight while stirring. It is cooled in ice, filtered and the filtrate concentrated in vacuo. The concentrate is made strongly basic with solid sodium hydroxide, the solution extracted with diethyl ether, the extract washed with brine, dried and evaporated in vacuo. The residual oil is dissolved in 500 ml. ethanol, the solution made acidic with ethanolic hydrogen chloride, the solid formed filtered off and recrystallized twice from ethanol, to yield the 1-aminomethyl-2-methylaminomethylbenzene dihydrochloride.

EXAMPLE 27

To the solution of 10.0 g. 1,2-bis-aminomethyl-benzene in 125 ml. absolute ethanol, 16.0 g. 4-chlorophenyl-acetimidic acid ethyl ester are added and the mixture is refluxed for 24 hours. It is concentrated to half-volume in vacuo and the concentrate cooled in ice. The precipitate formed is filtered off and recrystallized from ethanol-isopropanol, to yield the 3-(4'-chlorobenzyl)-4,5-dihydro-1H-2,4-benzodiazepine hydrochloride of the formula

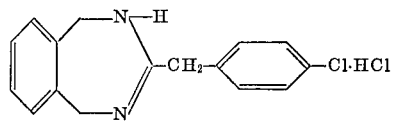

showing I.R.-bands at 3127 and 1678 cm.$^{-1}$.

EXAMPLE 28

To the solution of 1.85 g. 4-chloro-5-methyl-1,2-bis-aminomethylbenzene in 30 ml. absolute ethanol, 1.20 g. acetimidic acid ethyl ester are added and the solution is refluxed for 18 hours. After cooling in ice overnight, the precipitate formed is filtered off and recrystallized from isopropanol-acetonitrile, to yield the 7-chloro-3,8-dimethyl-4,5-dihydro-1H-2,4-benzodiazepine hydrochloride of the formula

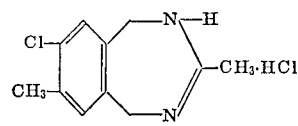

showing I.R.-bands at 3130 and 1682 cm.$^{-1}$.

EXAMPLE 29

To the solution of 3.0 g. 3-methyl-4,5-dihydro-1H-2,4-benzodiazepine in 50 ml. dimethylformamide, 1 g. potassium carbonate and 5 ml. methyl iodide are added and the mixture is heated in a sealed tube to 150° for 5 hours. After cooling it is filtered, the filtrate evaporated in vacuo and the residue recrystallized from a small volume of hot water, to yield the 3,4-dimethyl-4,5-dihydro-1H-2,4-benzodiazepine methiodide of the formula

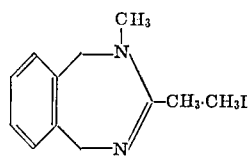

showing a strong I.R.-band at 1620 cm.$^{-1}$.

We claim:
1. The 4,5 - dihydro-1H-2,4-benzodiazepine having the formula

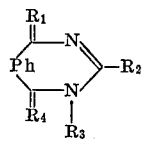

in which Ph is unsubstituted 1,2-phenylene or 1,2-phenylene substituted by up to two members of the group consisting of lower alkyl, hydroxy, mercapto, lower alkoxy, lower alkylenedioxy, lower alkylmercapto, halogeno, trifluoromethyl, nitro, amino or di-lower alkylamino, each of $R_1$ and $R_4$ are two hydrogen atoms or one hydrogen atom and one member of the group consisting of lower alkyl, $R_5$-lower alkyl or $R_5$, wherein $R_5$ is phenyl, (lower alkyl)-phenyl, (lower alkoxy)-phenyl, (lower alkylmercapto) - phenyl, (halogeno) - phenyl, (trifluoromethyl)-phenyl, (nitro)-phenyl or (di-lower alkylamino)-phenyl, $R_2$ is hydrogen, hydroxy, mercapto, amino, mono- or di-lower alkylamino, lower alkyleneimino, piperazino, N-lower alkyl-piperazino, morpholino or thiamorpholino, lower alkyl, lower alkoxy-lower alkyl, halogeno-lower alkyl, di-lower alkylamino-lower alkyl, lower alkyeneimino-lower alkyl, (piperazino, N-lower alkyl-piperazino, morpholino or thiamorpholino)-lower alkyl, $R_5$-lower alkyl or $R_5$ and $R_3$ is hydrogen, lower alkyl, $R_5$-lower alkyl or lower alkanoyl, the N-oxide, lower alkyl quaternaries or therapeutically useful acid addition salts thereof.

2. A compound as claimed in claim 1 and corresponding to the formula

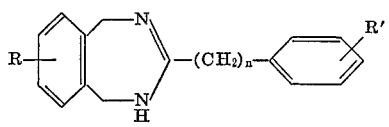

in which $n$ is the integer 0 or 1 and each of R and R' is hydrogen, methyl, methoxy, chloro, trifluoromethyl or nitro, or a therapeutically useful acid addition salt thereof.

3. As compound as claimed in claim 1 and corresponding to the formula

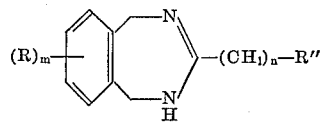

in which $m$ is the integer 1 or 2, $n$ is the integer 0 or 1, R is hydrogen, methyl, methoxy, chloro, trifluoromethyl or nitro and R'' is hydrogen, hydroxy, mercapto, methoxy, amino, mono- or dimethylamino, mono- or diethylamino, n- or i-propylamino, or piperidino, or a therapeutically useful acid addition salt thereof.

4. A compound as claimed in claim 3, in which formula $m$ is the integer 1 or 2, $n$ is zero, R is hydrogen, methyl, methoxy or chloro and R'' is amino, methylamino, dimethylamino, ethylamino, n- or i-propylamino, allylamino or cyclopropylamino, or a therapeutically useful acid addition salt thereof.

5. A compound as claimed in claim 3 and being the 3-methylamino-4,5-dihydro-1H - 2,4 - benzodiazepine or a therapeutically useful acid addition salt thereof.

6. A compound as claimed in claim 3 and being the 3-dimethylamino-4,5-dihydro-1H-2,4-benzodiazepine or a therapeutically useful acid addition salt thereof.

7. A compound as claimed in claim 3 and being the 3-methylamino-7,8-dimethoxy - 4,5 - dihydro-1H-2,4-benzodiazepine or a therapeutically useful acid addition salt thereof.

8. A compound as claimed in claim 3 and being the 3-methylamino-4,5-dihydro-1H-2,4-benzodiazepine hydrochloride.

References Cited

Sternbach: "The Chemistry of Benzodiazepines," Chem. Reviews, vol. 68, p. 783 (1968).

ALTON D. ROLLINS, Primary Examiner

U.S. Cl. X.R.

260—239 A, 239 E, 243 B, 247.1, 247.2 A, 247.5 B, 268 BC, 293.59, 295.5 S, 296 B, 309, 310 R, 326 N, 326.3, 326.5 S, 326.5 CA, 326.81, 326.9 329 F, 340.3, 340.5, 347.7; 424—244, 246, 248, 250, 267, 274

PO-1050
(5/69)

UNITED STATES PATENT OFFICE
CERTIFICATE OF CORRECTION

Patent No. 3,696,093    Dated October 3, 1972

Inventor(s) RODRIGUEZ ET AL

It is certified that error appears in the above-identified patent and that said Letters Patent are hereby corrected as shown below:

Column 18, claim 3, line 5, amend the right side of the structural formula to read:

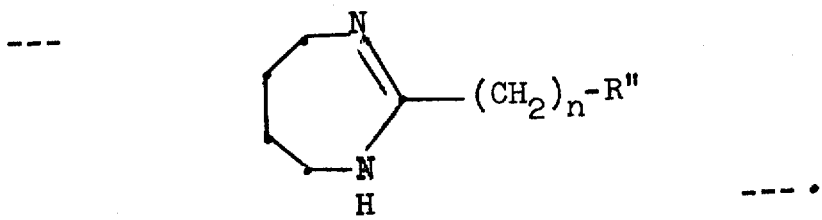

Signed and sealed this 14th day of May 1974.

(SEAL)
Attest:

EDWARD M.FLETCHER,JR.
Attesting Officer

C. MARSHALL DANN
Commissioner of Patents